United States Patent
Biliris et al.

(10) Patent No.: US 6,442,546 B1
(45) Date of Patent: Aug. 27, 2002

(54) MESSAGING SYSTEM WITH APPLICATION-DEFINED STATES

(75) Inventors: Alexandros Biliris, Chatham; Gisli Hjalmtysson, Gillette, both of NJ (US); Hosagrahar Visvesvaraya Jagadish, Ann Arbor, MI (US); Mark Alan Jones; Euthimios Panagos, both of New Providence, NJ (US); Michael Rabinovich, Gillette, NJ (US); Divesh Srivastava, Summit, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/222,881

(22) Filed: Dec. 30, 1998

(51) Int. Cl.$^7$ .............................................. G06F 17/30
(52) U.S. Cl. ........................ 707/10; 707/102; 707/104
(58) Field of Search .......................... 707/1, 2, 10, 100, 707/102, 103, 200, 201

(56) References Cited

U.S. PATENT DOCUMENTS

| | | | | |
|---|---|---|---|---|
| 5,473,680 A | * | 12/1995 | Porter ......................... | 379/201 |
| 5,504,892 A | * | 4/1996 | Atsatt et al. ................. | 707/103 |
| 5,530,861 A | * | 6/1996 | Diamant et al. ............... | 705/8 |
| 5,760,770 A | * | 6/1998 | Bliss et al. ................... | 345/335 |
| 5,802,510 A | * | 9/1998 | Jones ............................ | 707/2 |
| 5,826,039 A | * | 10/1998 | Jones ........................... | 709/206 |
| 5,870,559 A | * | 2/1999 | Leshem et al. ................ | 709/224 |
| 5,893,913 A | * | 4/1999 | Brodsky et al. ............... | 707/201 |
| 5,907,704 A | * | 5/1999 | Gudmundson et al. ......... | 717/1 |
| 5,917,489 A | * | 6/1999 | Thurlow et al. ............... | 345/347 |
| 5,923,848 A | * | 7/1999 | Goodhand et al. ............ | 709/219 |
| 5,956,715 A | * | 9/1999 | Glasser et al. ................. | 707/9 |
| 6,052,681 A | * | 4/2000 | Harvey .......................... | 707/3 |
| 6,057,841 A | * | 5/2000 | Thurlow et al. ............... | 345/347 |
| 6,065,012 A | * | 5/2000 | Balsara et al. ................. | 707/102 |
| 6,069,947 A | * | 5/2000 | Evans et al. ................... | 379/229 |
| 6,078,924 A | * | 6/2000 | Ainsbury et al. .............. | 707/101 |
| 6,115,709 A | * | 9/2000 | Gilmour et al. ............... | 707/9 |
| 6,154,783 A | * | 11/2000 | Gilmour et al. ............... | 709/245 |

* cited by examiner

Primary Examiner—Thomas Black
Assistant Examiner—Mary Wang
(74) Attorney, Agent, or Firm—Morgan&Finnegan, LLP

(57) ABSTRACT

A messaging system in which a core messaging infrastructure stores and manages messaging attributes, but applications external to the core infrastructure define and modify most attributes. Attribute types may be easily defined or modified, the manner in which attribute values are obtained may be easily defined or modified, and the entity types to which attributes are assigned may be easily defined or modified. The messaging system includes a plurality of messaging entities, such as messages, folders, and users, a plurality of attributes associated with the messaging entities, and a plurality of applications. Each application is operable to examine and modify at least some of the messaging entities and attributes. An application selection device is operable to examine at least some of the messaging entities and at least some of the attributes and to select an application to be invoked, from among the plurality of applications, based on values of the examined messaging entities and attributes. An application invocation device invokes the selected application. The applications may define and modify a type of an attribute and/or may define and modify an association of an attribute with a messaging entity.

18 Claims, 7 Drawing Sheets

MESSAGING SYSTEM WITH APPLICATION-DEFINED STATES

FIELD OF THE INVENTION

The present invention relates to a messaging system that provides flexible messaging attributes.

BACKGROUND OF THE INVENTION

Messaging systems assign certain attributes to messages they process. For example, many messaging systems assign an attribute representing the time of arrival. Some attributes may be assigned depending upon the type of the message. For example, a sender attribute may be assigned if the message type is such that the sender is known. An email message may, in addition, have attributes representing the subject of the message, the organization of the sender, etc.

In conventional messaging systems, the sets of attributes are fixed. For example, an email message may have a time of arrival attribute and a subject attribute. This set of attributes is fixed; additional attributes cannot be added. Likewise, the manner in which the attribute values are obtained is fixed. For example, the time of arrival attribute is obtained from the system timer, while the subject attribute is manually input by the user. These arrangements cannot be changed. Finally, the entity types to which attributes are assigned are fixed.

As messaging systems evolve to be capable of processing arbitrary message types for applications which may not yet have been defined, the fixed approach becomes very restrictive. A need arises for a messaging system in which attribute types may be easily defined or modified, the manner in which attribute values are obtained may be easily defined or modified, and the entity types to which attributes are assigned may be easily defined or modified.

SUMMARY OF THE INVENTION

The present invention is a messaging system which allows new messaging services to be easily implemented on top of a core messaging infrastructure. The core messaging infrastructure stores and manages messaging attributes, but only includes a small set of pre-defined attributes. Additional attributes may be defined by messaging applications external to the core infrastructure. The external applications may easily define or modify the attributes they have defined. The manner in which attribute values are obtained may be easily defined or modified and the entity types to which attributes are assigned may be easily defined or modified by applications themselves.

The present invention includes a plurality of messaging entities, such as messages, folders, and users, a plurality of attributes associated with the messaging entities, and a plurality of applications. Each application is operable to examine and modify at least some of the messaging entities and attributes. An application selection device is operable to examine at least some of the messaging entities and at least some of the attributes and to select an application to be invoked, from among the plurality of applications, based on values of the examined messaging entities and attributes. An application invocation device invokes the selected application.

The applications may define and modify a type of an attribute and/or may define and modify an association of an attribute with a messaging entity.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
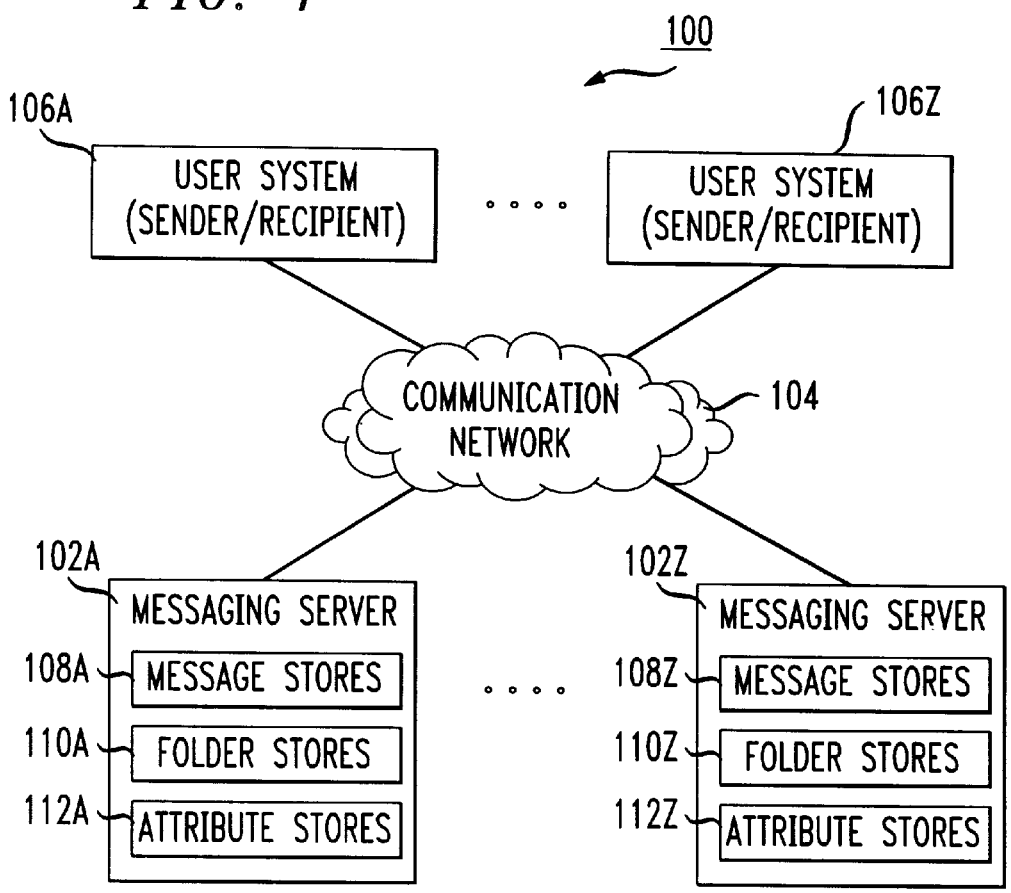
FIG. 1 is a block diagram of a messaging system, according to the present invention.

A block diagram of messaging system 100 is shown in FIG. 1. Messaging system 100 includes one or more messaging servers 102A–Z, connected by communication network 104. Each messaging server may include the indicated functional blocks. For example, messaging server 102A may include message stores 108A, folder stores 110A and attribute stores 112A. User systems 106A–Z, which are sender and/or recipient systems, are also connected by communication network 104. Alternatively, other well-known network arrangements may be used, such as two or more networks linked by bridges, etc.

The arrangement of messaging servers is invisible to the users. A message from any user system, addressed to any other user system or systems, may be stored on any messaging server, or on any number of messaging servers. Thus, messaging server network 100 is essentially an active distributed database. Messaging servers may be located at geographically separate locations.

Figure 2:
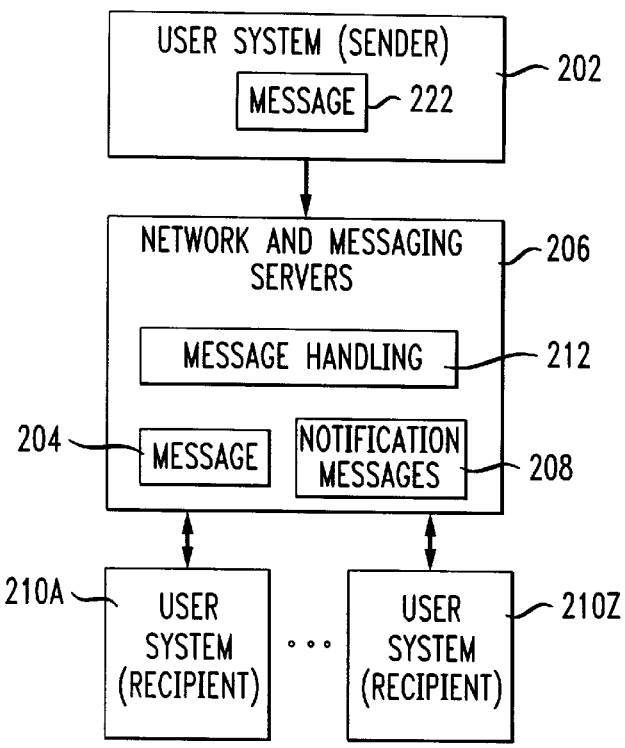
FIG. 2 is a logical block diagram of message handling in the system of FIG. 1.

A logical block diagram of message handling in messaging system 100 is shown in FIG. 2. A sender of a message uses user system 202, which is acting as a sender system, to generate a message 222 and transmit the message over communication network 104 to one or more messaging servers 102A–Z. Message 204 may be any type of message, such as email, voicemail, video, graphic, fax, etc. The present invention is applicable to any type of message that may be represented electronically.

Communication network 104 and messaging servers 102A–Z are logically included in block 206. Message 204 is then stored in one or more messaging servers 102A–Z, where it is available for access by any user system, such as user systems (recipient) 210A–Z to which the message is addressed. Optionally, notification messages 208 may be sent to the recipient systems, to notify the message recipients that message 204 is available for access. Message handling block 212, which is included in block 206, performs the message handling functions for the messaging system.

Figure 3:
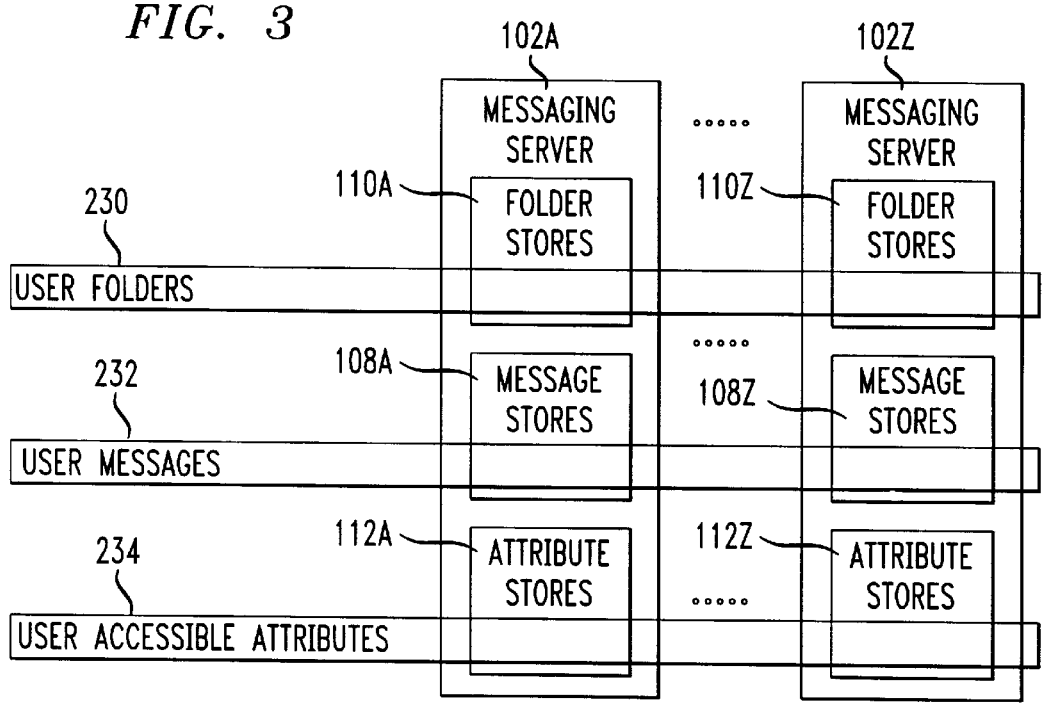
FIG. 3 is a logical block diagram of a user access arrangement in the system of FIG. 1.

A logical block diagram of a user access arrangement in messaging system 100 is shown in FIG. 3. A user deals with messages, folders and attributes. A particular user's folders are presented to the user as one group of folders, even though the folders may actually be stored on a plurality of messaging servers. For example, user folders 230 are presented to the user as one group, but are stored in a plurality of folder stores, such as folder stores 110A on messaging server 102A and folder stores 110Z on messaging server 102Z. Likewise, user messages 232 are presented to the user as one group, but are stored in a plurality of message stores, such as message stores 108A on messaging server 102A and message stores 108Z on messaging server 102Z. User accessible attributes are presented as attached to the message, folder or user to which they relate, but may actually be stored on a plurality of messaging servers. For example, user accessible attributes 234 may be stored in attribute stores 112A on messaging server 102A and attribute stores 112Z on messaging server 102Z.

The messaging server at which a particular message, folder or attribute is stored in messaging system 100 is not determined by fixed rules, as with conventional messaging systems. Rather, the storage strategy may be determined by any factors desired by the operator of the messaging system. Typically, the most important factors will be performance and cost. Likewise, such factors may be used to determine when or how a message is transported from one location to another, or which paths are used for such transport. In particular, depositing a message in the messaging network does not establish a connection between users.

Figure 4:
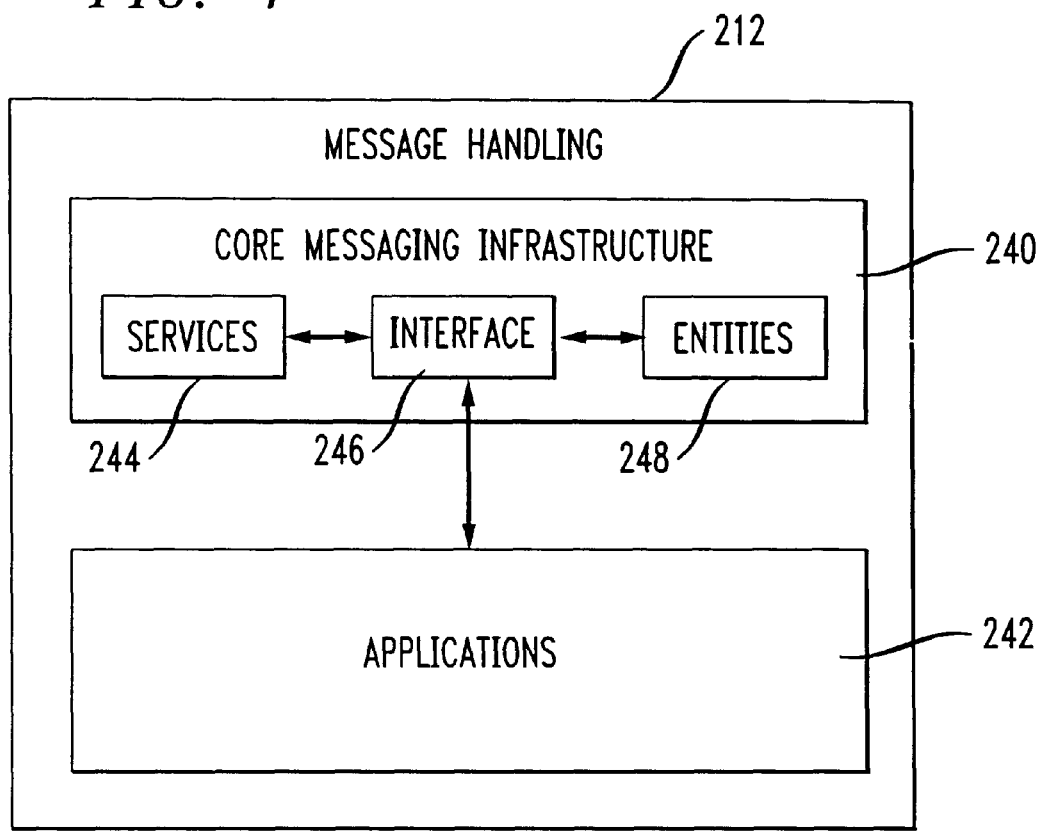
FIG. 4 is a block diagram of the logical division of processing in the system of FIG. 1.

The message handling block 212 is shown in greater detail in FIG. 4. Message handling block 212 includes two levels of messaging processing: the core messaging infrastructure block 240 and applications block 242. Core messaging infrastructure block 240 includes the standard or built-in processing functions of messaging system 100. For example, block 240 includes services block 244, interface block 246 and entities block 248. Services block 244 includes software programs that perform the built-in processing functions of messaging system 100. Entities block 248 includes stores containing messaging entities such as messages, folders and attributes, as well as software programs that maintain and provide access to the messaging entities. Interface block 246 interfaces the core messaging infrastructure to applications block 242. Applications block 242 includes externally-defined and user-defined messaging applications, which process the messaging entities of block 248 as desired.

Figure 5:
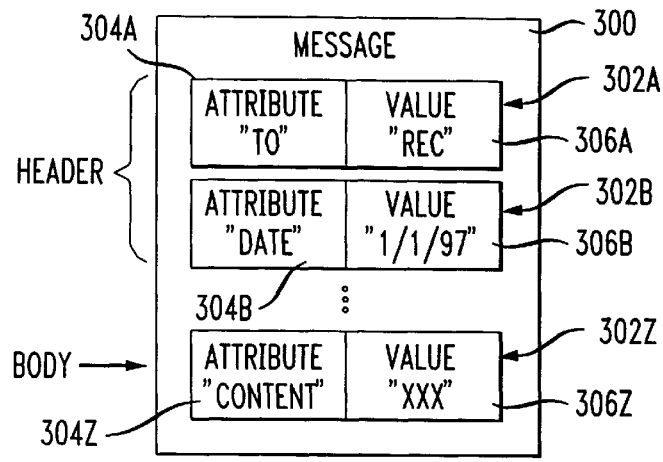
FIG. 5 is an exemplary format of a message used in the system of FIG. 2.

The fundamental entity in a messaging system that supports electronic mail is the message. As shown in FIG. 5, a message 300 consists of (i) one or more header fields, like 'To', 'Date', 'Subject' and 'From', some of whose values are structured, and some of whose values are unstructured and (ii) a body, which is typically unstructured. Message 300 is a set of attribute/value pairs, one for each header field in the message, and one for the entire content (both header and body) of the message. For example, message 300 includes header fields 302A and 302B and body 302Z. Field 302A includes attribute 304A, which indicates that field 302A is the "To" field, and value 306A. Likewise, field 302B includes attribute 304B, which indicates that field 302B is the "Date" field, and value 306B. Body 302Z includes attribute 304Z, which indicates that this is the "Content", and value 306Z. These are merely examples of attribute/value pairs; additional attribute/value pairs may also be associated with messages.

Messages are typically sent to users, or user groups, and these are part of our conceptual model as well. Users and user groups are also naturally modeled as a set of attribute/value pairs. For example, a user can be modeled by specifying values for attributes such as 'givenName' and 'e-mail'. User groups may have attributes for their name, for specifying membership in the group and so on.

Figure 6:
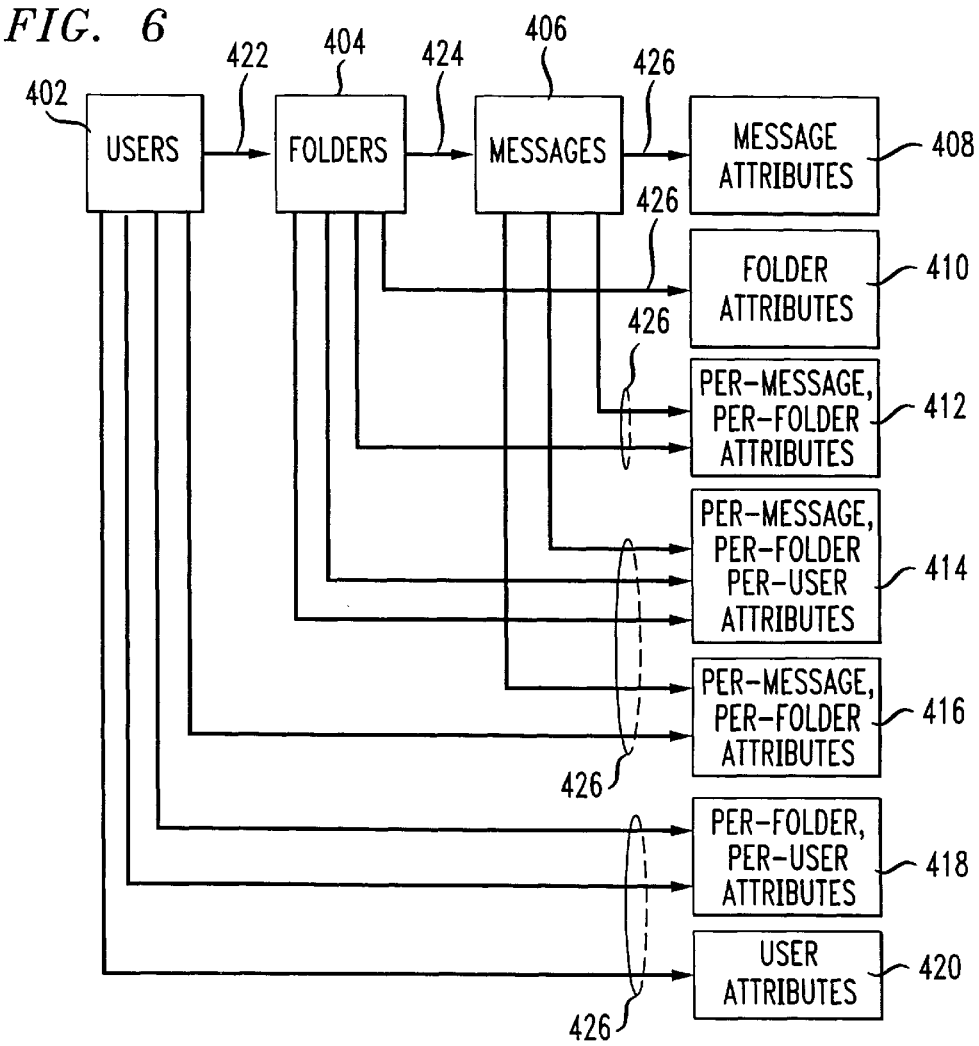
FIG. 6 is a logical block diagram of the relationships among various entities present in the system of FIG. 2.

The relationship among various entities in the present invention is shown in FIG. 6. The entities shown are users 402, folders 404, messages 406 and various attributes 408–420. Users 402, operating user systems, generate messages, operations on messages, such as sending, forwarding and deleting messages, and operations on folders. Folders are associated with users using unique folder identifiers 422. Messages are associated with folders using unique message identifiers 424. Attributes are associated with users, folders and messages using unique attribute identifiers 426.

An example of a user-specific attribute may be a flag indicating whether or not a user has seen a given message. Note that this attribute cannot be made message-specific, because a message may be addressed to multiple users. While one user might have read a message, another user may not, and yet another user may not be even interested in maintaining this kind of information, because the user downloads all messages to local storage and then manages the information locally.

Messages 406 sent to users 402 or user groups get deposited in folders 404, and users access their messages by examining folders (not shown in FIG. 6). A folder can be viewed as consisting of a set of messages, as well as a set of sub-folders. A folder has attributes 410 as well, such as its date of creation, the number of messages in it currently, and so on. A more complex example of a folder-specific attribute is a read/unread flag. A user may define multiple overlapping folders (folders), so that the same message may appear in more than one folder. If the read flag is associated with the user, then once the user reads the message in any folders, it will be marked read in all its folders. The folder-specific read flag allows a feature whereby a message is marked read only in those folders where it has been read.

An example of a message-specific attribute is a read counter, which counts the number of users who have read the message. Such attribute could be used by a service supporting promotions, where, e.g., the first ten people who read the message get a prize, and then the message in other peoples' folders must change or disappear.

Often, attribute/value pairs need to be associated not just with individual messaging entities, but with relationships between messaging entities. For example, a message can be deposited in multiple folders, and when a message is read in a folder, replied to, or deleted from a folder, this fact can be recorded as the value of a "per-message, per-folder" attribute 412. Such attributes are not restricted to a predetermined set either.

When many users subscribe to a shared folder, many of the per-message, per-folder attributes 412 must be extended to a per-message, per-folder, per-user attribute 414, to distinguish between accesses to the messages in the shared folder by different users. With shared folders, it is conceptually possible for different subscribers to have different access control rights. Some users may be allowed only to read messages, while others may be allowed to delete messages as well. Modeling such information requires having per-folder, per-user attributes 418.

Finally, recipients may associate additional attribute/value pairs with messages, independently of their folders that contain the message. Such attributes can be viewed as per-message, per-user attributes 416.

When a high-level folder is defined in terms of other folders, an attribute associated with the high-level folder may be specified to apply to the high-level folder only, or, recursively, to all lower-level folders as well. For example, if the read/unread flag above is associated with such a high-level folder and applies recursively, a message read in the high-level folder will appear as read in all lower-level folders, but not in other folders belonging to the user.

If a message is directed to multiple groups of recipients, the functionality of the previous example can be extended to each individual group. In other words, once ten people from the same group read a message, it must disappear from folders of other people from this group. However, people from other groups are not affected. This functionality can be provided by associating the read count with a particular group of users.

Every entity in the messaging system, whether a message, a folder, a user, or a user group, has a unique identifier. Attributes may apply to combinations of messages, folders, and users. The present invention manages such attributes. The appropriate collection of entity identifiers are taken together to functionally determine the values of attributes associated with these entities or combination thereof. Thus, the message identifier and the folder identifier together functionally determine values of attributes that are per-message per-folder. Similarly, attributes that are per-message per-user take the message identifier and user identifier together as the identifier "key".

Figure 7:
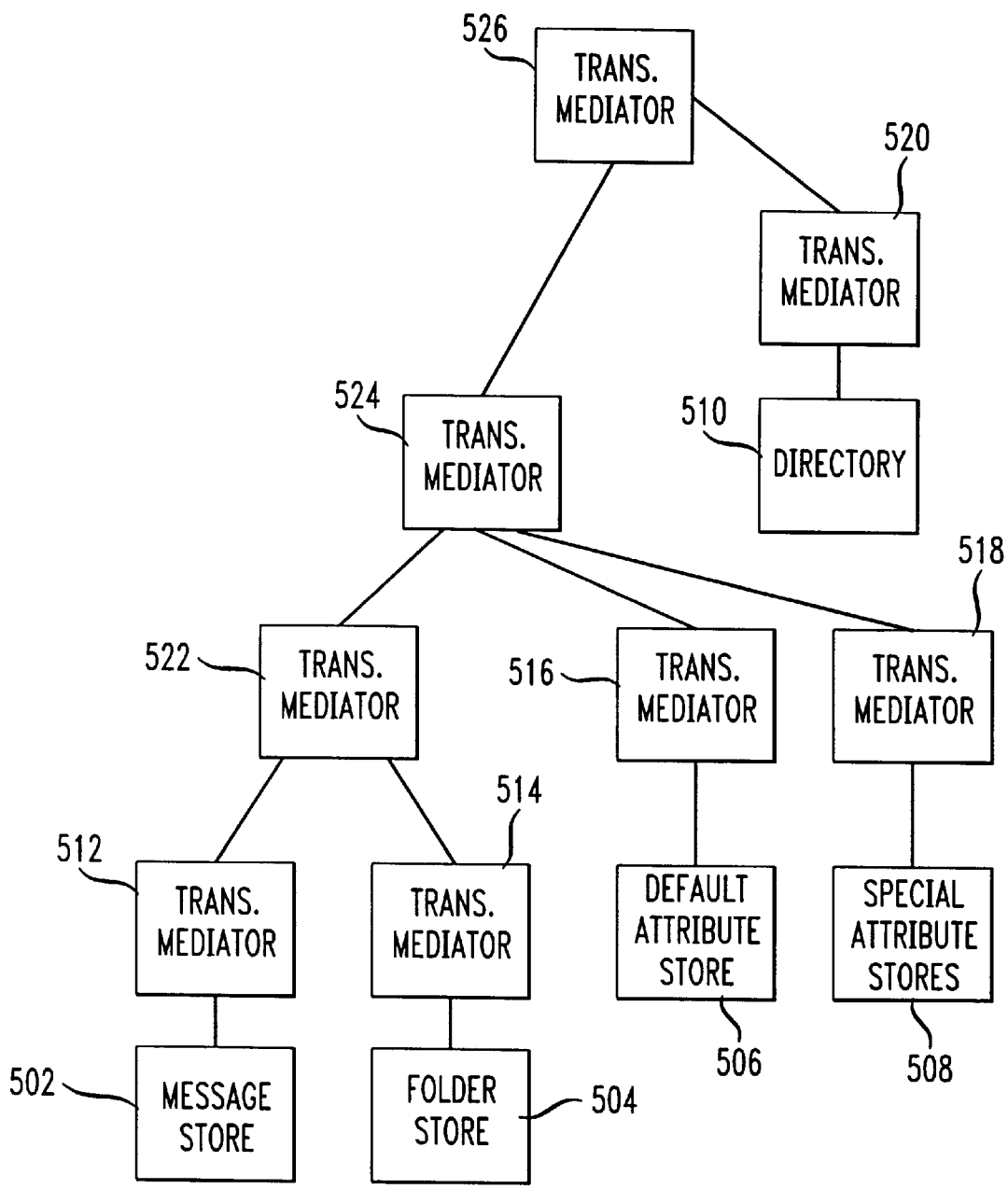
FIG. 7 is a logical block diagram of the stores of the present invention and their associated transactional mediators.

The entities shown in FIG. 6 are stored in a number of logical storage devices, termed "stores". The stores are arranged in a hierarchy, as shown in FIG. 7. The stores include a message store 502, a folder store 504, a default attribute store 506 and one or more special attribute stores 508. In addition, a directory 510 is hierarchically arranged with the stores. Each store and the directory has associated with it a transactional mediator 512–520. A transactional mediator is a software interface between its associated object and other objects in the hierarchy. A transactional mediator provides application program interface (API) conformance and query optimization. In addition, each transactional mediator provides transactional support to ensure consistency in the presence of concurrent activity and to facilitate recovery in the presence of failures. Each transactional mediator with an associated store is attached to an interior transactional mediator. Interior transactional mediators 522–526 do not have associated stores. Instead, the interior transactional stores serve the function of combining the facilities provided by the attached transactional mediators.

Every store in the network is modeled as an "attribute store", which maintains a relationship between one or more identifiers and a set of attributes. The basic access functions supported are to return identifiers matching a specified attribute value and to return all attributes given an identifier key.

Figure 8:
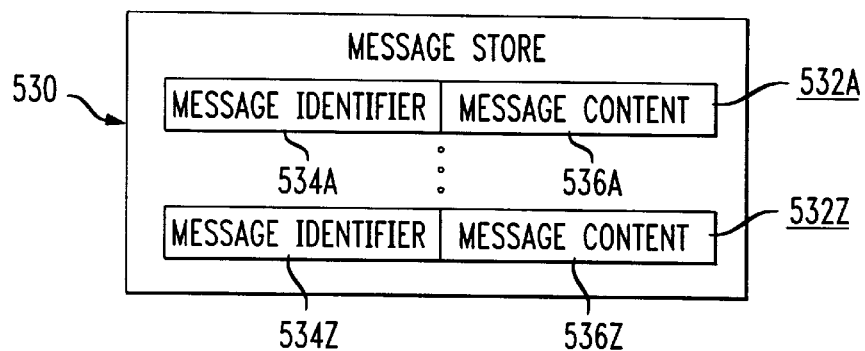
FIG. 8 is an exemplary block diagram of a message store of FIG. 7.

Message store 530, shown in FIG. 8, maintains the value of the most important attribute of a message, namely its content. Message store 530 includes a plurality of messages 532A–Z. Each message includes a unique message identifier, such as 534A, and the message content, such as 536A. The message content includes all conventional message headers. For example, the standard RFC-822 message headers are retained as part of the content of a standard email message. This is done because various applications external to the messaging system may depend upon the header information and there is no way for the messaging system to predict in advance what all such applications may be. By contrast, the standard SMTP envelope is not stored as part of the message content, because the envelope information is of use only to the messaging system and not to client applications.

The message content is treated as an arbitrary stream of bits by the message store. Semantics are handled by higher-level services. When a new message for a local recipient arrives in the messaging system, the message is passed to a message store, where it is stored, given a message identifier, and then "exposed" through the transaction manager to any core services that may wish to extract and index message attributes. Finally, a message arrival event is signaled outside the core layer for consumption by services interested in the event.

For example, the entire RFC-822 message is the message "content", and it is recorded in the message store with a unique message identifier.

In a preferred embodiment, the present invention uses a file system as the message store, with message stored in files under appropriate directory trees. In addition, a simple distribution model is used, with messages stored locally at the site of usual access for each recipient. A user accessing messages from a remote site may observe some performance differences due to the time required to retrieve messages from the user's home site, but sees no difference in the manner of access. If there are multiple recipients homed at one site, only a single copy of the message is stored at the site for all users.

Figure 9:
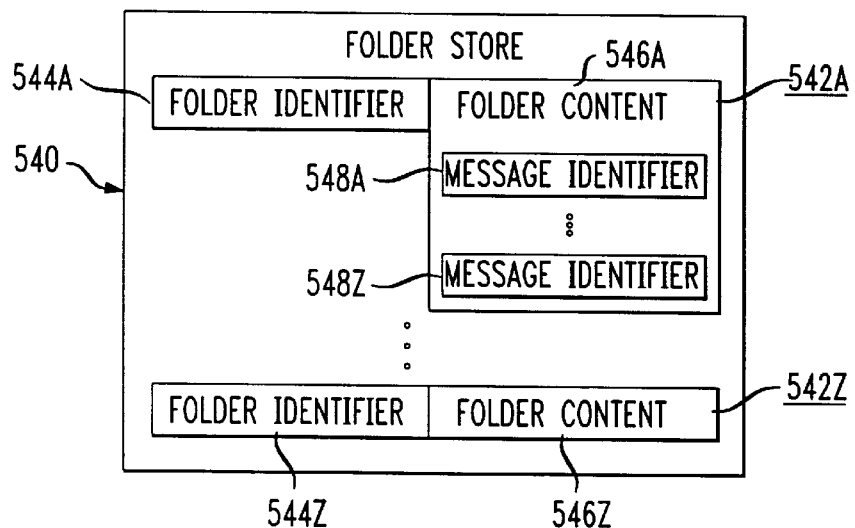
FIG. 9 is an exemplary block diagram of a folder store of FIG. 7.

A folder store 540 is shown in FIG. 9. Folder store 540 includes a plurality of folders 542A–Z. Each folder includes a unique folder identifier, such as 544A, and folder content, such as 546A. In this application, the term folder is used to refer to sets of messages and sub-folders that have been organized for convenience of access by a user. A user may specify multiple folders as a way of classifying messages. One user may have a folder for messages addressed to a particular group, and may classify the message in that folder. Another user may have a folder for messages from a particular person and classify the message there.

In contrast with conventional folders, in the present invention, a folder, such as folder 542A, contains only the message identifiers of its messages, such as message identifiers 548A–Z. This arrangement has several benefits. Since the folder itself does not have to contain large messages or complex message types, it can be quite light-weight. The separation of the message store from the folder store is also crucial for permitting late binding of message content to folders. As in the case of the message store, a preferred embodiment of the folder store is by means of a file system.

Figure 10:
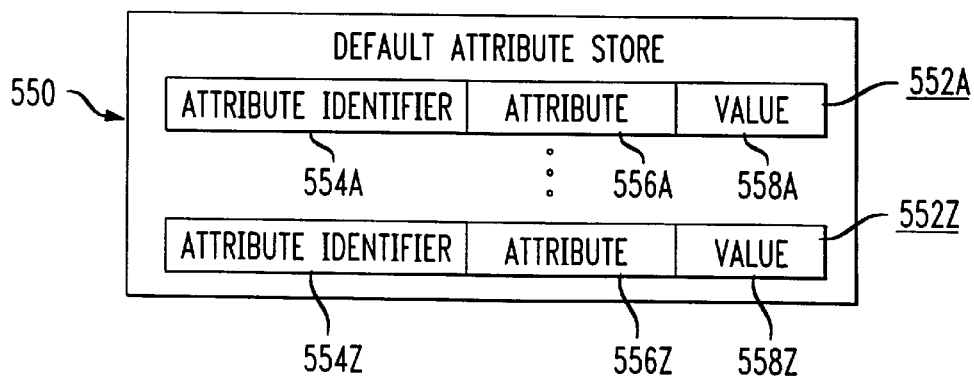
FIG. 10 is an exemplary block diagram of a default attribute store of FIG. 7.

The majority of attributes to be stored in a messaging system tend to be fairly simple and quite numerous. For example, flags that indicate the state of the message are quite common. All such attributes are managed by a default attribute store 550, shown in FIG. 10. Default attribute store 550 contains a plurality of attributes 552A–Z. Each attribute includes a unique attribute identifier, such as 554A, an attribute specifier, such as 556A and a value, such as 558A. While the default attribute store is capable of storing any attribute, "special" attributes, such as message content or full-text indices, may be more effectively stored in appropriately designed specialized stores.

The present invention includes a directory facility, with information describing user entities, which are generally end-users or user groups, but which could also represent network devices, such as a printer, or services, such as newsgroups and mailing lists. User entities in the directory have attributes, some of which are mandatory, while others are optional. Any standard directory protocol may be used to provide access to the entity attributes but preferably, the well-known Lightweight Directory Access Protocol (LDAP) standard is used.

Whereas the directory facility is logically centralized, like the message store, it may actually be implemented either in a centralized manner or in a distributed and partitioned manner. The LDAP standard is compatible with both implementation schemes.

Figure 11:
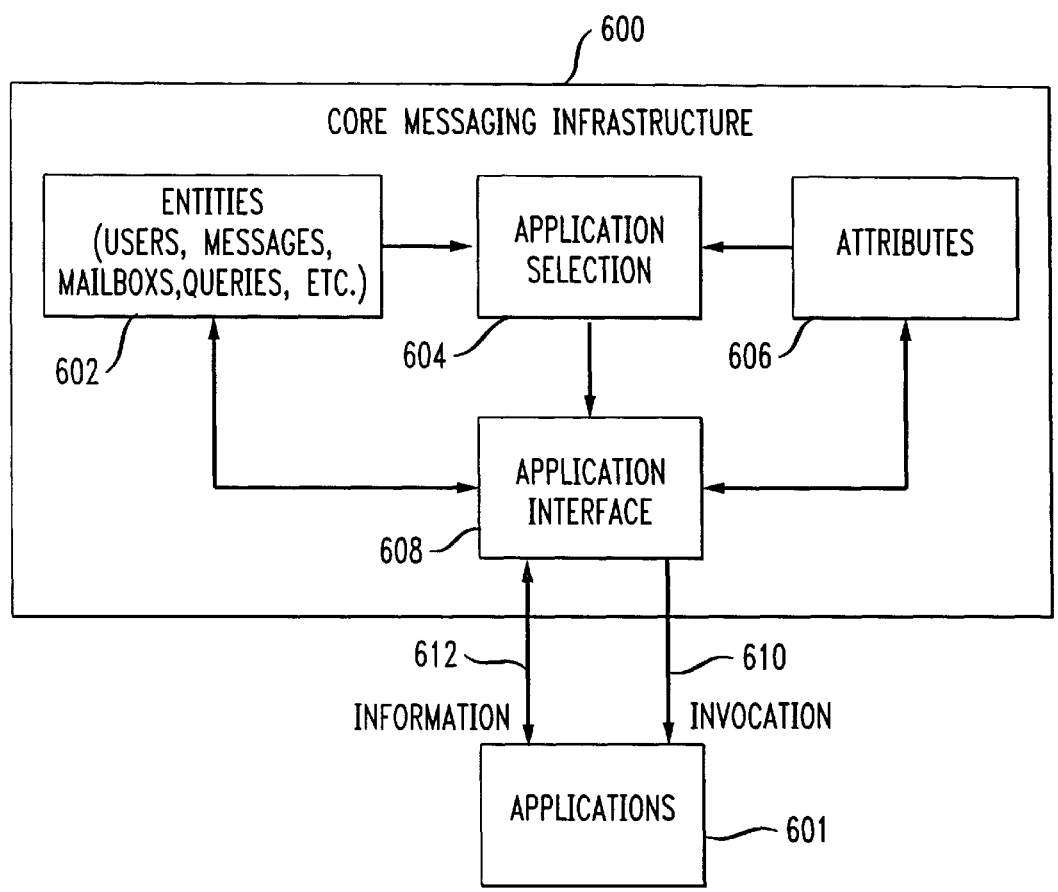
FIG. 11 is a logical block diagram of application-defined state processing.

A logical block diagram of application-defined state processing in the present invention is shown in FIG. 11. Core messaging infrastructure block 600 and applications block 601 are shown. Block 600 includes entities block 602, application selection block 604, attributes block 606 and application interface 608. Entities block 602 includes messaging system entities, such as user information, messages, folders, user groups, etc. Attributes block 606 includes any or all of the attributes associated with the entities in block 602. The state of the messaging system is defined as the set of values of all of the entities and attributes in the messaging system. Applications in applications block 601 may be selectively invoked based on the state of the messaging system. Likewise, applications may modify the state of the messaging system by modifying the values of various entities and attributes.

Application selection block 604 selects the application or applications, if any, that are to be invoked based on the state of the messaging system. Application selection block 604 examines the values of the entities in block 602 and the attributes in block 606, and determines when applications included in applications block 601 are to be invoked, based on values, and combinations of values, that have been examined. Application selection block 604 may examine the values of all entities and attributes, or it may only examine the values of some entities and/or attributes.

When application selection block 604 determines that an application should be invoked, block 604 causes application interface block 608 to communicate with applications block 601. This communication causes invocation 610 by applications block 601 of the application or applications specified in the communication. Using application interface 608, an invoked application may communicate information 612 in order to examine the values of the entities and attributes to which the application is allowed access. The invoked application is responsible for interpretation of the values and may also modify those entities and attributes to which the application is allowed access.

An application may also be invoked by mechanisms not shown in FIG. 11, such as by certain events in the core messaging infrastructure to which the application subscribes.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A messaging system comprising:
    a core messaging infrastructure including a plurality of messaging entities and a plurality of attributes which are associated with the messaging entities;
    a plurality of applications which are external to the core messaging infrastructure and are operable to examine and modify at least some of the messaging entities and attributes of the core messaging infrastructure; and
    an application selection device operable to examine at least some of the messaging entities and at least some of the attributes and select an application to be invoked, from among the plurality of applications, based on values of the examined messaging entities and attributes.

2. The system of claim 1, further comprising:
    an application invocation device invoking the selected application.

3. The system of claim 2, wherein at least one application is operable to define and modify a value of an attribute.

4. The system of claim 3, wherein the messaging entities comprise messages, folders, and users.

5. The system of claim 4, wherein at least one application is operable to define and modify an association of an attribute with a messaging entity.

6. The system of claim 5, wherein at least one attribute is associated with a relationship among entities.

7. A method of operating a messaging system comprising a core messaging infrastructure having a plurality of messaging entities and a plurality of attributes associated with the messaging entities, and a plurality of applications which are external to the external messaging infrastructure and are operable to examine and modify at least some of the messaging entities and attributes of the core messaging infrastructure, the method comprising the steps of:
    examining at least some of the messaging entities and at least some of the attributes; and
    selecting an application to be invoked, from among the plurality of applications, based on values of the examined messaging entities and attributes.

8. The method of claim 7, further comprising the step of:
    invoking the selected application.

9. The system of claim 8, wherein at least one application is operable to define and modify a value of an attribute.

10. The system of claim 9, wherein the messaging entities comprise messages, folders, and users.

11. The system of claim 10, wherein at least one application is operable to define and modify an association of an attribute with a messaging entity.

12. The system of claim 11, wherein at least one attribute is associated with a relationship among entities.

13. A messaging system comprising:
    a core messaging infrastructure including a plurality of messaging entities and a plurality of attributes which are associated with the messaging entities;
    a plurality of applications which are external to the core messaging infrastructure and are operable to examine and modify at least some of the messaging entities and attributes of the core messaging infrastructure;
    means for examining at least some of the messaging entities and at least some of the attributes; and
    means for selecting an application to be invoked, from among the plurality of applications, based on values of the examined messaging entities and attributes.

14. The system of claim 13, further comprising:
    means for invoking the selected application.

15. The system of claim 14, wherein at least one application is operable to define and modify a value of an attribute.

16. The system of claim 15, wherein the messaging entities comprise messages, folders, and users.

17. The system of claim 16, wherein at least one application is operable to define and modify an association of an attribute with a messaging entity.

18. The system of claim 17, wherein at least one attribute is associated with a relationship among entities.

* * * * *